(12) United States Patent
Parker et al.

(10) Patent No.: US 12,136,130 B2
(45) Date of Patent: Nov. 5, 2024

(54) AUTOMATIC TAX ACCOUNT MANAGEMENT

(71) Applicant: Block, Inc., San Francisco, CA (US)

(72) Inventors: Philip Parker, San Francisco, CA (US); Andrew Gertig, San Francisco, CA (US)

(73) Assignee: Block, Inc., Oakland, CA (US)

( * ) Notice: Subject to any disclaimer, the term of this patent is extended or adjusted under 35 U.S.C. 154(b) by 149 days.

(21) Appl. No.: 17/899,598

(22) Filed: Aug. 30, 2022

(65) Prior Publication Data

US 2022/0414790 A1    Dec. 29, 2022

Related U.S. Application Data (63) Continuation of application No. 17/357,778, filed on Jun. 24, 2021, now Pat. No. 11,468,519.

(51) Int. Cl.
G06Q 40/00 (2023.01)
G06Q 20/20 (2012.01)
G06Q 40/12 (2023.01)

(52) U.S. Cl.
CPC ......... *G06Q 40/123* (2013.12); *G06Q 20/207* (2013.01)

(58) Field of Classification Search
CPC .......................... G06Q 40/123; G06Q 20/207
USPC ......................................................... 705/31
See application file for complete search history.

(56) References Cited

U.S. PATENT DOCUMENTS

| | | | |
|---|---|---|---|
| 5,193,057 A | 3/1993 | Longfield | |
| 5,724,523 A | 3/1998 | Longfield | |
| 6,202,052 B1 | 3/2001 | Miller | |
| 6,898,573 B1 | 5/2005 | Piehl | |
| 7,127,425 B1 | 10/2006 | Wilson | |
| 8,135,634 B2 | 3/2012 | Abeles | |
| 8,380,592 B2 | 2/2013 | Throndson et al. | |
| 8,447,667 B1 | 5/2013 | Dinamani et al. | |
| 8,452,676 B1 | 5/2013 | Talan et al. | |
| 9,330,415 B1 | 5/2016 | Castleman et al. | |
| 10,867,355 B1 | 12/2020 | Wang et al. | |

(Continued)

FOREIGN PATENT DOCUMENTS

| WO | 2021/158702 A1 | 8/2021 |
|---|---|---|
| WO | 2022/271428 A1 | 12/2022 |

OTHER PUBLICATIONS

"Understanding Credit Score Algorithms", Amplify Credit Union, Retrieved from Internet URL: www.goamplify.com/blog, (Dec. 7, 2017), pp. 1-7.

(Continued)

*Primary Examiner* — Russell S Glass
(74) *Attorney, Agent, or Firm* — Lee & Hayes, P.C.

(57) ABSTRACT

Technology is described for managing a user account. An example method includes: a payment service system (PSS) monitoring in real-time transactions of users, receiving a request from a user to complete a transaction, and dynamically determining a predicted tax liability amount for the transaction that increases or decreases a total tax liability of the user. The PSS then displays the predicted tax liability amount on a display of the users device with a request for confirmation to continue with the transaction. If confirmation is received, the PSS modifies tax liability information for the user that reflects the completed transaction. The user may also cancel the transaction responsive to receiving the predicted tax liability amount.

20 Claims, 7 Drawing Sheets

(56) References Cited

U.S. PATENT DOCUMENTS

| | | | |
|---|---|---|---|
| 10,872,384 B1* | 12/2020 | Hanekamp, Jr. | G06Q 40/123 |
| 10,943,309 B1* | 3/2021 | Morin | G06N 5/04 |
| 11,138,676 B2* | 10/2021 | Wang | G06Q 40/123 |
| 11,393,026 B1 | 7/2022 | Parker et al. | |
| 11,468,519 B1 | 10/2022 | Parker et al. | |
| 2002/0111888 A1 | 8/2002 | Stanley et al. | |
| 2003/0061131 A1 | 3/2003 | Parkan | |
| 2005/0038722 A1 | 2/2005 | Throndson et al. | |
| 2006/0235776 A1 | 10/2006 | Temme | |
| 2007/0136160 A1 | 6/2007 | Wilson et al. | |
| 2010/0076875 A1 | 3/2010 | Ernst et al. | |
| 2014/0207653 A1 | 7/2014 | Hanson | |
| 2016/0042466 A1 | 2/2016 | Herndon et al. | |
| 2021/0150624 A1* | 5/2021 | Tucker | G06Q 20/405 |
| 2021/0232976 A1* | 7/2021 | Hsiao | G06N 20/00 |
| 2021/0334897 A1 | 10/2021 | Dital et al. | |
| 2022/0414765 A1 | 12/2022 | Parker et al. | |

OTHER PUBLICATIONS

Josephson, A., "What is a Refund Anticipation Loan?," Asset, dated Mar. 18, 2021, Retrieved from the Internet URL: https://smartasset.com/taxes, pp. 1-8.

Anonymous, "System and Method to Assist Foreign Visitors in the Process of Receiving Tax Refunds and Provide Marketing Promotions from Affiliated Stores," IPCOM000242115D, 7 pages (Jun. 19, 2015).

Elliehausen, G., "Consumer Use of Tax Refund Anticipation Loans," Credit Research Center Monograph #37, 93 pages (Apr. 2005).

Non-Final Office Action mailed Sep. 1, 2021, for U.S. Appl. No. 17/357,791, of Parker, P., et al., filed Jun. 24, 2021.

Non-Final Office Action mailed Oct. 27, 2021, for U.S. Appl. No. 17/357,778, of Parker, P., et al., filed Jun. 24, 2021.

Final Office Action mailed Dec. 13, 2021, for U.S. Appl. No. 17/357,791, of Parker, P., et al., filed Jun. 24, 2021.

Notice of Allowance mailed May 20, 2022, for U.S. Appl. No. 17/357,778, of Parker, P., et al., filed Jun. 24, 2021.

Final Office Action mailed Feb. 7, 2022, for U.S. Appl. No. 17/357,778, of Parker, P., et al., filed Jun. 24, 2021.

Notice of Allowance mailed Mar. 14, 2022, for U.S. Appl. No. 17/357,791, of Parker, P., et al., filed Jun. 24, 2021.

International Search Report and Written Opinion for International Application No. PCT/US2022/032089, mailed Sep. 14, 2022.

Waggoner Kelly: "Cash App review", 1-14, Nov. 25, 2020 (Nov. 25, 2020), Retrieved from the Internet:URL:https://web.archive.org/web/20201125230920/https://www.finder.com/square-cash.

* cited by examiner

FIG. 1

Mobile Device and Payment Application 200

Tax Account Management Method 500

AUTOMATIC TAX ACCOUNT MANAGEMENT

RELATED APPLICATIONS

This Application claims priority to U.S. patent application Ser. No. 17/357,778, filed Jun. 24, 2021, which is incorporated herein by reference.

TECHNICAL FIELD

Income received by an employee is often deposited electronically by direct deposit into a checking or savings account of the employee. This can allow the employee to receive payroll funds faster and can avoid the use of physical checks, and it can result in payroll checks being automatically deposited into the employee's account. Such payroll checks typically include certain deductions taken from the employee's gross income, to cover items such as tax withholdings, retirement account contributions, and medical plan expenses.

After each calendar year, the employee is typically required to prepare tax return documentation that reports to the federal, state, or local government information related to the amount of taxes owed and already paid by the employee. If the employee has paid more in taxes than the employee owes, the employee can expect to receive a tax refund from the government. Alternatively, if the employee has not paid enough in taxes to cover the amount owed, the employee can expect to pay an additional amount to cover the deficiency.

BRIEF DESCRIPTION OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

There is a need for improved systems and methods for managing tax obligations that arise after each calendar year. In one example, a computer-implemented method is provided for managing a tax payment account for a user. A payment service system (PSS) receives payroll funds for the user (e.g., salary and/or wages) and maintains tax liability information for the user. The PSS determines a projected total tax liability for the user, based on the user's payroll funds, direct deposit information, and/or the user's transactions made with the PSS, such as securities transactions, cryptocurrency transactions, charitable donations, and child care expenses. The PSS compares the projected total tax liability for the user with the user's tax withholdings to determine a projected amount owed in taxes by the user. In response to a user request, the PSS can establish a tax payment account configured to hold funds that the user can use to pay any taxes owed by the user. The tax payment account can receive funds diverted from the payroll funds and/or can receive proceeds from user transactions, such as securities transactions. In general, the PSS can monitor transactions made by the user (e.g., in the PSS), dynamically calculate tax consequences associated with the transactions, and update the user's projected total tax liability on an ongoing basis (e.g., after each transaction or at regular intervals, such as each day, week, or month). When the total tax liability changes, the PSS can intelligently adjust the amount of funds being diverted into the tax payment account. The PSS can divert funds in a manner that achieves a tax goal of the user, such as having a balance in the tax payment account that is at or near the amount owed in taxes.

Additionally or alternatively, in some examples, the PSS can prepare tax return documentation for the user. The documentation can be prepared based on information related to payroll funds, tax withholdings, tax deductions, and/or tax credits. Such information can be obtained by the PSS from the user and/or the user's employer, and/or the PSS can derive the information from the user's transactions made in the PSS, payroll deposit information collected by the PSS and/or by a merchant having an account with the PSS, and/or through interfacing with a third-party payroll provider via an application programming interface (API).

Further, in some implementations, the PSS can determine that the user will be receiving a tax refund (e.g., from the federal government), and the user may request to obtain a loan against the projected tax refund. In response, the PSS may generate a customized offer for the loan. The offer can be based on, for example, a confidence score for loan repayment, which can be based on, for example, a projected risk of default and/or a timing of the loan (e.g., compared to the timing of the tax refund payment), and/or based on transaction activity of the user on the PSS, including merchant transaction activity, securities (e.g., stocks) transactions, cryptocurrency purchase and sale activity, and the like. The confidence score can be determined using one or more machine learning models that receive information about the loan as input and provide the confidence score as output. If the user accepts the loan offer, the funds for the loan can be added to an account the user has with the PSS.

Advantageously, the technology described herein solves the technical problem of prior tax services systems that require users to link to third party servers to obtain tax-related information. This prior approach creates additional network congestion and does not allow for dynamic updates to obtain or meet tax goals. The present technology reduces network congestion by keeping most or all tax-related information on a single platform (e.g., the PSS), thereby avoiding calls to third party systems for such information. The embodiments described herein also enable dynamic tax preparation on a per transaction basis using the PSS. Furthermore, the present platform identifies savings that expand tax services to users of the PSS.

Further, the features of determining income tax liability based on integrated PSS data and transactions provides a significant improvement to prior payment services (and tax services). Existing payment service platforms are limited to banking and trading; however, the present technology can simplify tax return preparation through the use of payroll data. In general, integrating tax data processing with a payment service platform, as described herein, reduces network congestion (e.g., by reducing data transmissions required for tax documentation or tax information), improves processing times (e.g., for projecting tax liabilities), reduces errors, and achieves more computationally efficient tax return preparation.

Advantageously, use of machine learning models and other predictive tools described herein can improve accuracy and/or automation of data processing. For example, the machine learning models can determine tax liabilities and loan offers more accurately and efficiently from various data, such as payroll data, direct deposit data, tax withholdings, and PSS transactions (e.g., securities transactions, charitable donations, etc.). Additionally or alternatively, the machine learning models and predictive tools can be used to determine how to most effectively or efficiently maintain a tax payment account for a user, based on tax consequences associated with transactions made via the PSS. Furthermore, and in at least one example, methods and systems described herein are able to provide loans to users against predicted tax refunds, based on accurate projections of tax refunds determined using machine learning models, predictive models, and/or heuristics applied to payroll data and transaction information via the PSS.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Figure 1:
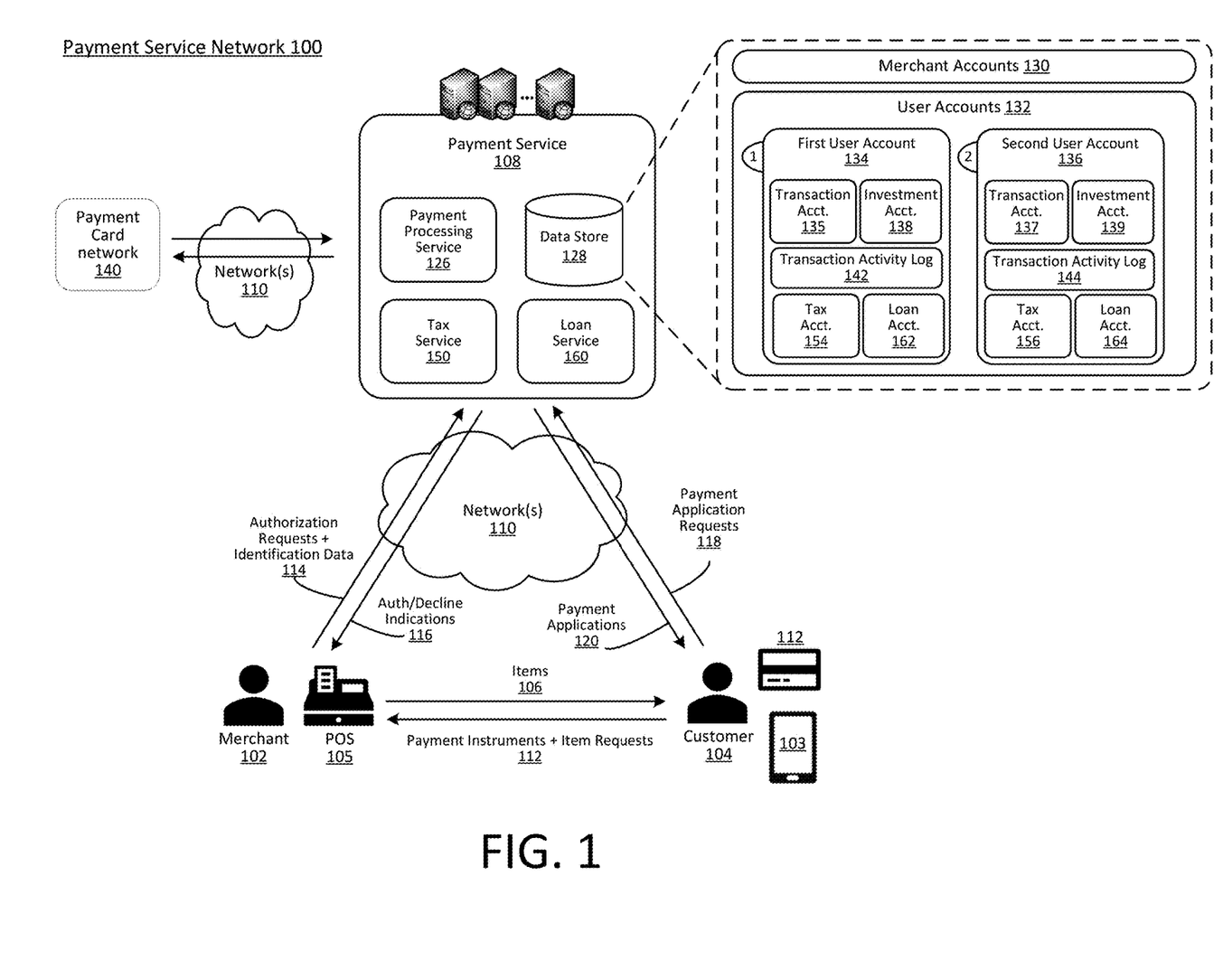
FIG. 1 illustrates a payment service network according to one example as described herein.

FIG. 1 illustrates a payment service network 100 in accordance with one example embodiment. According to one example, payment service network 100 includes merchant 102 that conducts transactions with customer 104 (or user 104) for items 106 (e.g., goods or services) offered by the merchant 102. The payment service network 100 includes a payment service system 108 (also referred to as "payment service" or "PSS") coupled to a merchant point of sale (POS) device 105 and customer device 103 via a network 110, to authorize payment instruments of customer 104. Customer 104 may engage in transactions with merchant 102 to obtain items 106. Customer 104 may provide, as shown at 112, payment instruments to merchant 102 along with requests for items 106 offered by merchant 102. In some implementations, a user of the systems and methods described herein (e.g., user 104) may be a merchant and/or may not be a customer (e.g., of merchant 102).

In various examples, the payment service system 108 can be or include an online platform for processing payments 126, providing a tax service 150, and/or providing a loan service 160, as described herein. The payment service system 108 or online platform can utilize or include one or more server computers, which can be referred to herein as platform servers or payment servers.

Merchant 102 may utilize POS device 105 for accepting payment from customer 104. POS device 105 may be any mobile or non-mobile device that includes instances of a POS application that executes on the POS device 105. The instances of the POS application may be or include a downloadable application provided by the payment service system 108, or embedded software running on an all-in-one POS device provided by the payment service system 108. POS device 105 may further include a wireless communication module with wireless communication capabilities (e.g., NFC, Bluetooth, cellular data, etc.), allowing wireless communication between POS device 105 and other devices with wireless communication capabilities. For example, POS device 105 may have an NFC-enabled chip that communicates with other NFC-enabled devices. The POS application may be provided by the payment service 108 and provide POS functionality to POS device 105 to enable merchant 102 (e.g., a business or owners, employees, or agents of the business) to accept payments from customer 104. In some types of businesses, POS device 105 may correspond to a store, restaurant, website, or other place of business of the merchant, and thus, may be a fixed location that typically does not change on a day-to-day basis, or may correspond to an Internet commerce site. In other types of businesses, however, the location of POS device 105 may change from time to time, such when the merchant operates a food truck, is a street vendor, is a cab driver, etc., or has an otherwise mobile business, e.g., in the case of a merchant who sells goods or services at buyers' homes, places of business, and so forth.

As used herein, a merchant may include any business engaged in the offering of goods or services for acquisition by customers. Actions attributed to a merchant may include actions performed by owners, employees, website servers, or other agents of the merchant, and thus no distinction is made herein unless specifically discussed. In addition, as used herein, the customer 104 may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction conducted between customer 104 and merchant 102. For example, when paying for a transaction, customer 104 can provide the amount that is due to the merchant using cash or other payment instrument 112 (e.g., a debit card, a credit card, a stored-value or gift card, a check, through an electronic payment application on device 103 carried by the customer, or the like). The merchant can interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, and/or Visa (EMV) standard (e.g., EMV cards). In other examples, other types of payment instruments include cards or computing devices that communicate via radiofrequencies such as radio frequency identification (RFID) tags, near field communication (NFC) devices, etc.

During the transaction, POS device 105 can determine transaction information describing the transaction, such as an identifier of the payment instrument (e.g., payment card number, account credentials, or other payment device identifier), an amount of payment received from the customer, the item(s) acquired by the customer, a time, location (e.g., street address, GPS coordinates, IP address, etc.) and date of the transaction, a payment card network 140 associated with the payment instrument, an issuing bank of the payment instrument, a name or user account of the customer, contact information of the customer, type of currency, IP address of POS device 105, IP address of customer device 103, and so forth. POS device 105 can send the transaction information to payment service 108 over network 110 (e.g., including the Internet), either substantially contemporaneously with the conducting of the transaction (in the case of online transactions) or later when POS device 105 is in the online mode (in the case offline transactions).

In an offline transaction, POS device 105 may store information related to the transaction, including, but not limited to, a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide at least a subset of the stored information to the payment service 108 over the network 110. The network 110 may represent or include any one or more wired or wireless networks, such as a Wi-Fi network, a cellular network, the Internet, or the like. In an online transaction, POS device 105 may send this information to payment service 108 over network 110 substantially contemporaneously with the transaction with the customer 104. While FIG. 1 depicts the network 110 as occupying two separate regions, it is understood that the network 110 can be or include a single network (e.g., the Internet), multiple networks (e.g., the Internet and one or more local networks), or similar networks.

After merchant 102 receives the payment information from customer 104, merchant 102 may send respective authorization requests, along with information related to the respective transactions, to payment service 108, as illustrated at 114. Payment service 108 may include payment processing service 126 and data store 128 that stores merchant accounts 130 and user accounts 132, as well as the transaction histories of merchants and users.

The payment processing service 126 may function to receive the information regarding a transaction from POS device 105 of merchant 102 and attempt to authorize the payment instrument 112 used to conduct the transaction. Payment processing service 126 may then send an indication of whether the payment instrument has been approved or declined back to POS device 105, as illustrated at 116.

Generally, when a customer 104 and a merchant 102 enter into an electronic payment transaction, the transaction is processed by electronically transferring funds from a financial account associated with the customer 104 to a financial account associated with the merchant 102. As such, the payment processing service 126 may communicate with one or more computing devices of a payment card network 140 (e.g., MasterCard® or VISA®) over network(s) 110 to conduct financial transactions electronically. Payment processing service 126 can also communicate with one or more computing devices of one or more banks, processing/acquiring services, or the like over the network 110. For example, payment processing service 126 may communicate with an acquiring bank, an issuing bank, and/or a bank maintaining user accounts for electronic payments. Payment processing service 126 may also communicate with, or access user and merchant accounts maintained by payment service 108. In some examples, the payment processing service 126 can serve as a broking or exchange platform for managing the purchase and sale of securities and/or cryptocurrency on the platform, and/or can communicate with one or more entities that perform or manage securities transactions and/or cryptocurrency transactions.

An acquiring bank may be a registered member of a card association (e.g., Visa® or MasterCard®) and/or may be part of a payment card network 140. An issuing bank may issue credit cards to buyers (e.g., customer 104) and may pay acquiring banks for purchases made by cardholders (e.g., customer 104) to which the issuing bank has issued a payment card. Accordingly, in some examples, the computing device(s) of an acquiring bank may be included in the payment card network and may communicate with the computing devices of a card-issuing bank to obtain payment. Further, in some examples, the customer 104 may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument 112, in some instances other entities (e.g., banks associated with the merchant 102 or with customer payment instruments 112) may provide transaction data, such as part of a batched, periodic process.

According to one example, data store 128 may be used to store merchant accounts 130 and user accounts 132, among other data. User accounts 132 may store records of user accounts associated with each user of payment service 108. For example, user accounts 132 may include a first user account 134 and a second user account 136. Each of the accounts of user accounts 132 may include information related to the respective balance and transaction history associated with each user account. Each of the user accounts 132 may include one or more balances associated with a payment service and further include access to external bank accounts. For example, first user account 134 includes transaction account 135 and investment account 138, and second user account 136 includes transaction account 137 and investment account 139.

According to one example, transaction accounts 135 and 137 may include stored balances maintained by payment service 108 on behalf of its users. Investment accounts 138 and 139 may be used by users to save a stored balance towards a particular goal or otherwise to allow payment service 108 to maintain an investment on behalf of its users. Each user account 134 and 136 of user accounts 132 may also include a loan account representing funds that are provided to the to the user as a loan or capital by the payment service 108. Each user account 134 and 136 of user accounts 132 may further include access to external payment card networks (e.g., payment card network 140) to facilitate transactions with credit cards, debit cards, and the like.

Furthermore, transaction history for each user account may be stored using an individual log for each user account. For example, first user account 134 includes transaction activity log 142 and second user account 136 includes transaction activity log 144. Transaction activity logs 142 and 144 may be used to store transaction history for each respective user account, including debits and credits made to the balances thereof. Similarly, transaction history for merchants may be stored in merchant accounts 130 using an individual log for each merchant.

According to one example, each of the user accounts 132 may include stored values of multiple currencies, such as fiat currency, cryptocurrency, equity value, or other monetary value represented by digital assets. Each of the currencies may be stored directly in each account of user accounts 132. Each of the user accounts 132 may further include access to external accounts that facilitate such currencies (e.g., third party cryptocurrency exchanges/wallets, equity holding accounts, etc.).

According to one example, merchant accounts 130 may store information associated with respective ones of the merchants 102. For instance, the merchant accounts 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication protocols (e.g., NFC, Bluetooth, etc.). Therefore, when the customer visits the physical premises of merchant 102, for example, POS device 105 may detect the presence of customer device 103. The POS device 105 may accordingly determine that the customer 104 is present. In another example, one or both of POS device 105 and customer device 103 may share its location (e.g., GPS coordinates) to a common service for determining when customer device 103 and POS device 105 are located within a proximity threshold of one another, and for mediating a transaction between customer device 103 and POS device 105.

In another example, customer 104 may utilize customer device 103 to check in at the merchant location, and POS device 105 may receive an indication of this check in. When the customer visits a digital presence of merchant 102 (e.g., mobile app, website, etc.), customer 104 may log in or otherwise provide information (e.g., a cookie on the device 103) from which the merchant 102 determines that the customer 104 is at the merchant location. Of course, while a few examples are listed, it is to be appreciated that the merchant 102 and/or payment service 108 may determine when the customer 104 is present at the merchant location in any other number of ways. In each instance, after payment service 108 receives an indication that customer 104 is co-located with merchant 102, the payment service 108 may determine whether to send one or more previously expressed item preferences of the customer 104 to the merchant 102.

In addition, customer 104 may desire to receive an instance of a payments application, such as a mobile wallet application, from the payment service 108. FIG. 1 illustrates that the customer 104 may send payment-application requests 118 to payment service 108. In response, payment service 108 may provide instances of the application 120 back to customer device 103. In addition, payment service 108 may map an identification of the instance of the application 120 to the user accounts 132.

Figure 2:
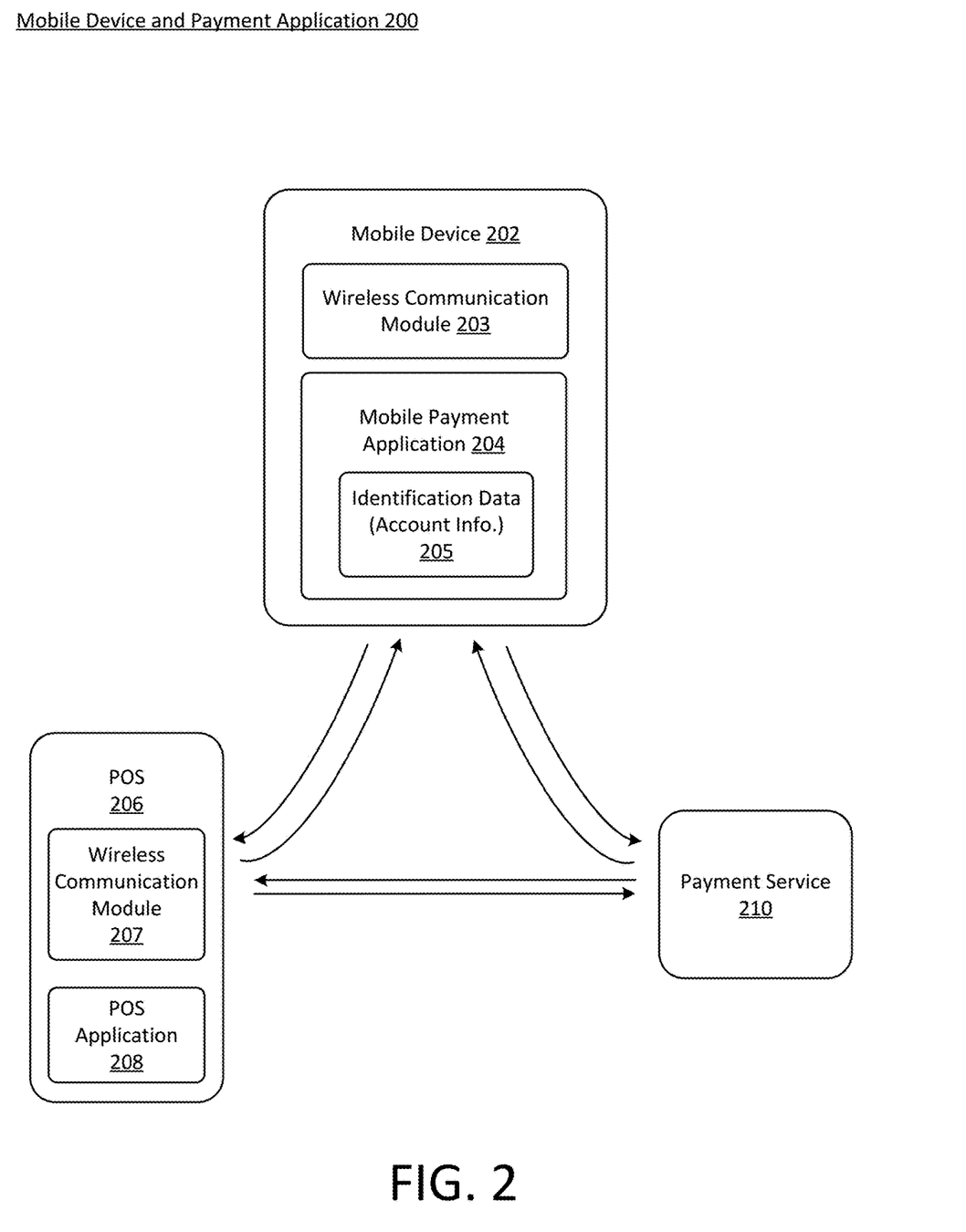
FIG. 2 illustrates a mobile device and payment application according to one example as described herein.

FIG. 2 illustrates a mobile device and payment application 200 in accordance with one example embodiment. Mobile device 202 and POS device 206 may be computing devices with wireless communication modules 203 and 207, respectively, with wireless communication capabilities (e.g., NFC, Bluetooth, cellular data, etc.), allowing wireless communication therebetween. A payment application 204 is a payment application provided by the payment service 210 and executes on a user's mobile device 202. POS device 206 can include a Point of Sale (POS) application 208 that is associated with one or more merchant systems and can be used by the customer to purchase products or services. The payment application 204 and POS application 208 can also be a website provided by payment service 210 (e.g., payment service 108), or any source website or application that provides a portal to send and accept payments for transactions using payment service 210. Applications 204 and 208 may be accessible through a web browser (e.g., Chrome® or Safari®) on the mobile device 202, according to one example. In another example, applications 204 and 208 can be software applications downloadable via an application store (e.g., Google Play Store®, Apple App Store®, etc.). Once accessed or registered into the applications 204 and 208, the web browser or application may remember the credentials (e.g., identification data 205) for subsequent visits (for example, through web browser authentication, web cookies, web history, etc.), allowing access to the applications without logging-in to an account again. The description herein is with reference to the payment application 204 and POS application 208 as installed applications; however, it will be understood that these applications as authenticated or unauthenticated applications on a web browser is within the meaning of the term. In various examples, the mobile device 202, the POS device 206, and/or the payment service 210 can be the same as or can include the customer device 103, the POS device 105, and/or the payment service 108, respectively.

Payment application 204 can include an electronic wallet application, money transfer application (e.g., application for sending and receiving money via email, phone, or other unique identifier), or any other application having stored therein identification data 205 linked to user accounts of payment service 210 or other data linked to one or more payment cards and/or bank accounts, both of which may be used by the owner of the mobile device to initiate transactions. Such transactions can include traditional purchase transactions between customers and merchants or service providers, person-to-person transactions, and the like.

Payment application 204 can also be used to manage internal payment cards (i.e., payment cards issued by payment service 108 to users having a user account 132). As such, options with respect to internal payment cards can be adjusted and managed using payment application 204. For example, when a user account of user accounts 132 includes multiple payment methods (e.g., credit card, bank account, loan account, etc.), payment application 204 can set one of those payment methods to be the default method for debits or credits when using an internal payment card.

Collectively, all tools for offering payment are herein referred to as payment instruments. For example, payment instruments can refer to mobile device 202 running payment application 204, internal payment cards, external payment cards, NFC-enabled payment cards, etc. The use of the term payment instrument does not imply a mechanism of use. For example, mobile device 202 may be utilized via NFC protocols (e.g., NFC Data Exchange Format (NDEF), NFC tags, etc.), or via use of software on mobile device 202 to send messages through web forms, applications, APIs, or messaging applications. As an additional example, payment cards, whether internal or external, can be presented to a merchant to be read, or a card number can be entered into a terminal under the control of the merchant or under the control of the customer. A payment instrument can include multiple payment instruments, such as when utilizing mobile device 202 to enter a payment card number. Throughout this description, specific payment instruments may be discussed, however, the specific payment instrument should not be considered limiting, and persons of ordinary skill in the art will appreciate instances in which a payment instrument such as a payment card can be substituted for another payment instrument such as a mobile device, and vice versa.

Tax Management Services

Referring again to FIG. 1, in certain examples, the payment service 108 provides a tax service 150 that can monitor tax liability for users (e.g., the customer 104), create tax accounts (e.g., tax accounts 154 and 156) that include funds for covering the tax liabilities, and generate tax documentation for the users. In a typical example, a user can receive payroll funds from an employer or other entity (e.g., a merchant or other business) that pays the user a salary or wages in exchange for services provided to the entity by the user. The payroll funds can be deposited into an account that is managed by the payment service system 108 for the user, such as transaction account 135. The payroll funds can be deposited into the account by direct deposit and/or can be associated with direct deposit information for the user. The direct deposit information can be obtained by the payment service system 108 and can include, for example, employer information, bank information, bank account information, and/or information related to a pay stub, such as, for example, gross wages (e.g., amount earned before deductions), tax deductions (e.g., federal tax, state tax, local tax, Social Security, Medicare, etc.), health insurance deductions, life insurance deductions, 401k deductions, and net pay (e.g., amount of "take home" pay, after deductions).

In certain examples, the tax service 150 can determine a tax liability for the user and can create and manage a tax account for the user, such as tax account 154. The tax liability for the user can be or include, for example, a total amount that the user will be required to pay in local, state, and/or federal taxes. The tax liability for the user can be determined based on the direct deposit information and/or other information related to the user. In some instances, for example, the tax liability can be determined based on tax liability information for the user, such as income information (e.g., gross wages), tax deduction information (e.g., local, state, and federal taxes, property taxes, etc.), and/or tax credit information. Additionally or alternatively, the tax service 150 can monitor transactions made by the user (e.g., using the payment service system 108) and can determine tax consequences associated with such transactions. For example, the tax service 150 can determine when the user has made transactions involving securities (e.g., stocks, mutual funds, etc.), cryptocurrency, charitable donations, childcare expenses, healthcare expenses, or property tax. Such transactions can be identified automatically by the tax service 150 (e.g., based on a merchant name, a merchant category code, transaction metadata, or other data associated with the transaction that describes the nature and details of the transaction) and/or can be identified based on information provided by the user. For example, the user can provide the payment service system 108 with information that allows the tax service to identify transactions that have tax consequences. Such information can be provided by the user with or without a request or prompt from the payment service system 108 for the information.

In general, the tax service 150 can use the tax liability information to determine, estimate, or project how much the user will owe in local, state, or federal taxes (e.g., at the end of a current tax year). For example, the tax service 150 can monitor the user's payroll funds and transactions to determine a total projected tax liability for the user for the current tax year. The tax service 150 can also maintain the tax account 154 to store funds for a projected deficiency in tax withholdings for the user. For example, when the user's projected tax withholdings (e.g., based on direct deposit information) are determined to be less than the user's projected tax liability based on a recent transaction (e.g., capital gains from stock sale), the tax service 150 can automatically divert a portion of funds from future incoming transactions (e.g., payroll funds, proceeds from the sale of securities or cryptocurrency on the platform) from one user account (e.g., investment account 138) to tax account 154, to cover the projected shortcoming in tax withholdings. The funds in the tax account 154 can be used to pay the user's tax bill, for example, when the user files a tax return after the end of the year.

The tax account 154 can receive funds from various sources. In some instances, for example, the tax account 154 can exchange funds with one or more other accounts maintained by the payment service system 108 for the user. If the tax service 150 concludes that a balance in the tax account 154 is too low to cover the projected tax bill, for example, the tax service 150 can transfer money to the tax account 154 from one or more other user accounts. Alternatively, if the tax service 150 concludes that the balance in the tax account 154 is higher than necessary to cover the projected tax bill, the tax service 150 can facilitate automated (e.g., real-time or near real-time) transfer of money from the tax account 154 to the one or more other user accounts. Additionally or alternatively, the tax account 154 can be funded by payroll funds received from an employer of the user. The tax service 150 can divert payroll funds, as needed, to the tax account 154. In general, it can be desirable to keep the balance in the tax account 154 at or near the projected tax bill or at or near some other account balance objective specified by the user. In some instances, however, the balance in the tax account 154 can deviate substantially from the desired balance until sufficient funds have been diverted from the payroll funds and/or transferred from other accounts. This is particularly true following one or more transactions made by the user that have tax consequences, as described herein.

Figure 3:
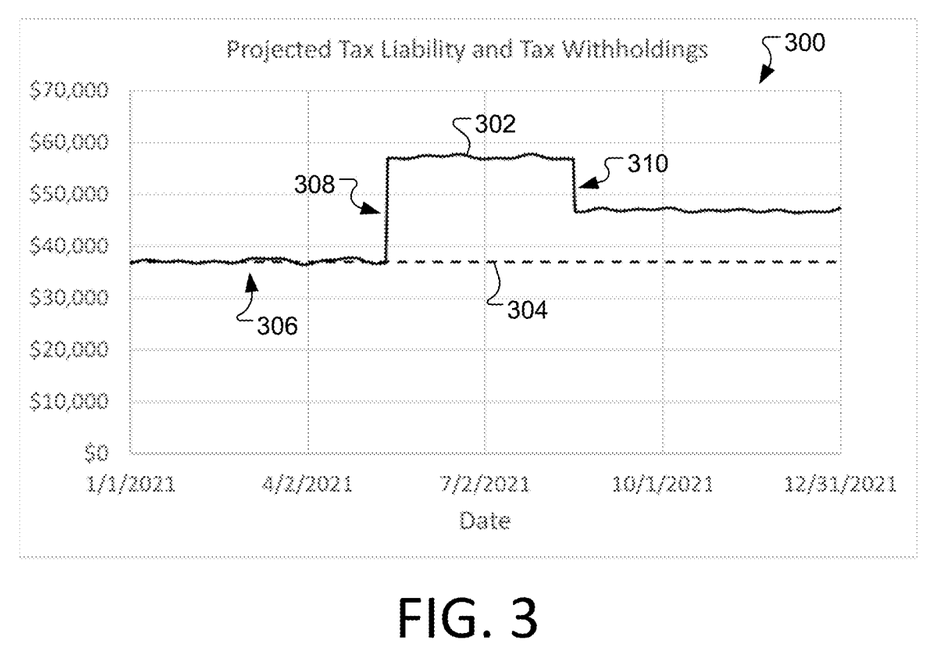
FIG. 3 a plot of a projected tax liability and projected tax withholdings for a user, in accordance with certain examples.

FIG. 3 is a plot 300 of a projected tax liability 302 and projected tax withholdings 304 for a user during the year 2021, as determined by the tax service 150, in accordance with certain examples. The projected tax withholdings 304 can be determined based on, for example, direct deposit information and/or projected tax deductions (e.g., received from the user or user's employer). For simplicity, the projected tax withholdings are constant during the entire year at $37,000 in this example. This can represent an example in which the user's tax deductions (e.g., from payroll) are constant over successive pay periods during the year.

To determine the projected tax liability 302, the tax service 150 can monitor the user's financial gains and losses during the year, for example, based on financial information received by the payment service system 108 (e.g., relating to user income and transactions). The projected tax liability 302 in this example is at or around $37,000 during an initial portion 306 of the year, which is consistent with the projected tax withholdings 304. The projected tax liability 302 increases by about $20,000 after a first transaction event 308, which can be or include, for example, a transaction in which the user generated $20,000 in taxable income (e.g., due to a sale of securities). At a second transaction event 310, the projected tax liability 302 decreases by about $10,000. The second transaction event 310 can be or include an event in which the user lost money (e.g., due to a sale of securities) or reduced a tax liability (e.g., due to a charitable donation or a tax credit). At the end of the year in this example, the user's projected tax liability 302 is at about $47,000, which is higher than the projected tax withholdings 304 of $37,000. The user can expect to owe about $10,000 in taxes when the tax return is prepared and filed in this case.

To prepare for this tax bill, the tax service 150 can maintain the tax account 154 for the user and can dynamically determine a balance that should be maintained in the tax account 154, based on transaction events, the projected tax liability 302, and the projected tax withholdings 304. The tax service 150 can determine, for example, that an appropriate balance to maintain in the tax account 154 is equal to a difference between the projected tax liability 302 and the projected tax withholdings 304. In other examples, a desired or target balance for the tax account 154 can be higher or lower than this difference (e.g., based on a user preference or available finances).

Figure 4:
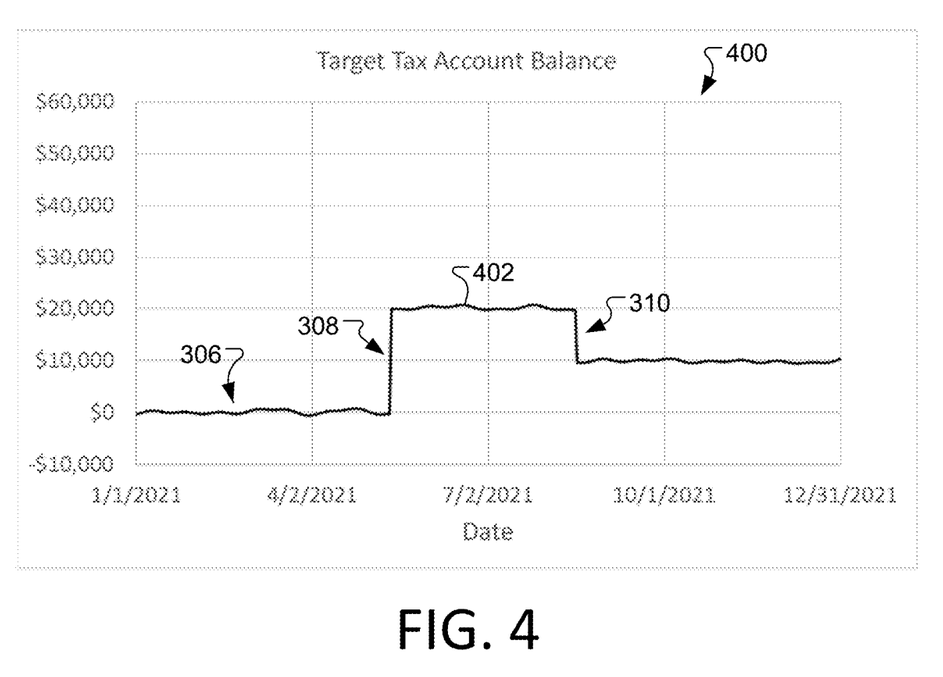
FIG. 4 is a plot of a desired or target tax account balance, in accordance with certain examples.

FIG. 4 is a plot 400 of a target tax account balance 402 for the year 2021. The target account balance 402 in this example is equal to the difference between the projected tax liability 302 and the projected tax withholdings 304. The target account balance is near $0 during the initial portion 306 of the year, increases to about $20,000 following the first transaction event 308, and decreases to about $10,000 following the second transaction event 310. At the end of the year, a balance of $10,000 is available in the tax account to pay the user's tax bill.

In various examples, the target tax account balance 402 on any given day may differ from an actual balance available in the tax account 154. The tax service 150 can move funds into and out of the tax account 154 in an effort to reach the target account balance 402 or minimize a difference between the target account balance 402 and the actual balance in the tax account 154. For example, payroll funds can be diverted into the tax account 154. Alternatively or additionally, funds can be exchanged between the tax account 154 and one or more other user accounts, as needed. One or more process control techniques (e.g., proportional control, derivative control, and/or integral control) can be used to control the balance in the tax account 154. For example, a rate at which funds are added to the account can depend on or be proportional to a difference between the actual balance and the target account balance 402. A larger difference can result in funds being transferred in or out of the tax account 154 at a higher rate. Additionally or alternatively, the amount of payroll funds to be transferred to the tax account 154 can be determined using machine learning models. Such models can be trained to learn user transaction behaviors and/or preferences in an effort to determine an appropriate target account balance 402 and/or an appropriate amount of payroll funds to divert into the tax account 154. Furthermore, the payment services can be configured to intelligently determine the optimum timing for moving money between accounts based on the user's transaction history and/or preferences. For example, the payment service may move money to a tax account at an earlier date (e.g., compared to a date for another user) if it is determined that a specific user has historically paid their taxes at a much earlier date than other users. Similarly, the payment service may determine that funds should be diverted to a tax account at a later date if a specific user tends to pay their taxes at a later date and/or has an upcoming payment obligation, such as a non-reoccurring payment (e.g., annual tuition fee payment).

Figure 5A:
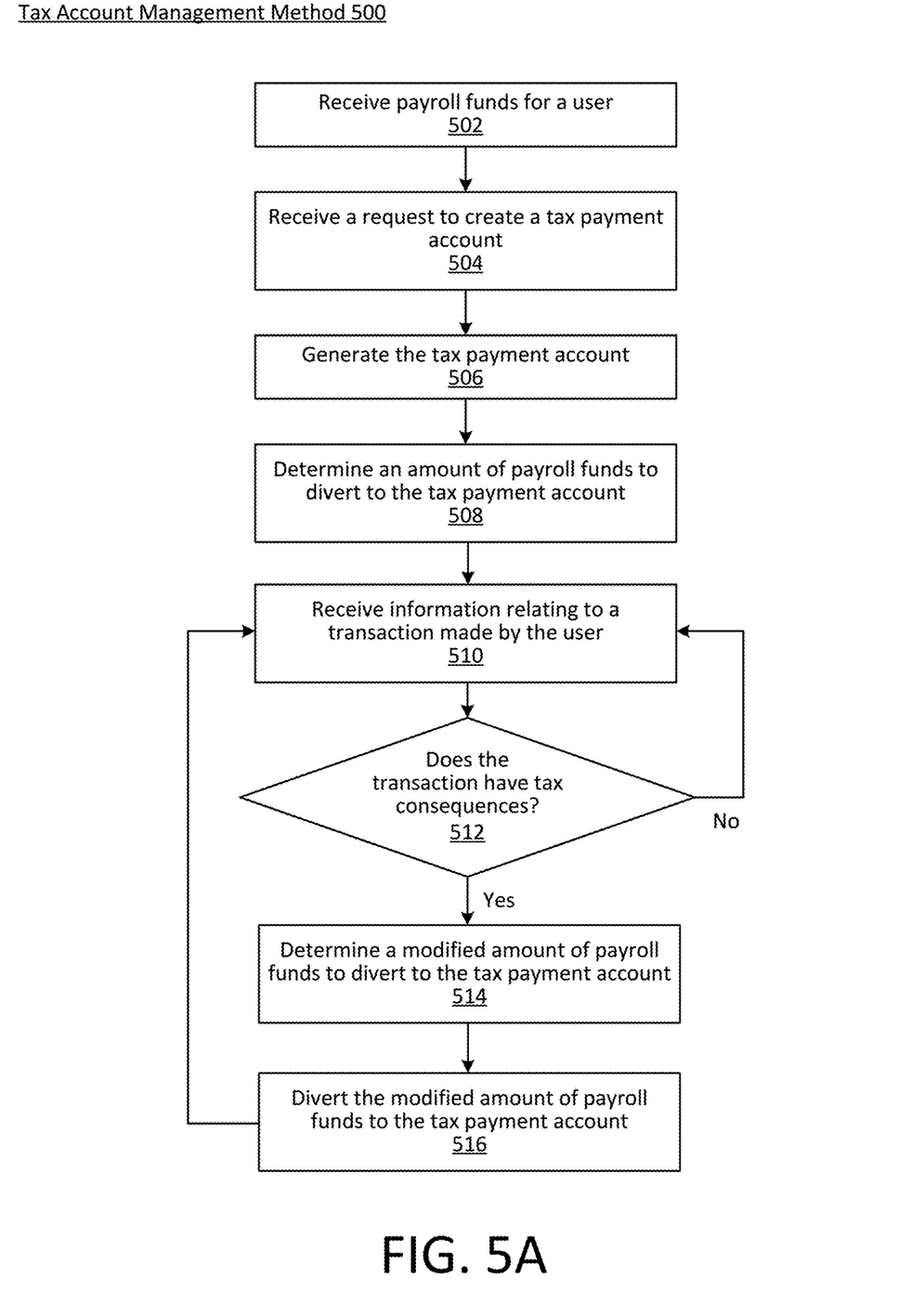
FIG. 5A is a flowchart of a method of managing a tax account, in accordance with certain examples.

FIG. 5A is a flowchart of a method 500 of managing a tax account, in accordance with certain examples. A payment service system (PSS) (e.g., the payment service system 108) receives (step 502) payroll funds for a user having an account (e.g., the transaction account 135) with the PSS. The payroll funds are associated with direct deposit information for the user, and the account maintains tax liability information for the user (e.g., based on the direct deposit information). The PSS receives (step 504) a request (e.g., from the user) to create a tax payment account. In response to the request, the PSS (or tax service 150) generates (step 506) the tax payment account (e.g., the tax account 154) for the user and determines (step 508), based on the tax liability information, an amount of the payroll funds to divert to the tax payment account. In some instances, for example, determining the amount of payroll funds to divert can include projecting (e.g., based on historical transaction information and payroll funds associated with the user) a predicted income or income funds provided to a primary account for the user (e.g., the user account 134 or the transaction account 135) over a period of time. The amount of payroll funds to divert can be determined based on the projected or predicted income. For example, when the predicted income to the primary account is high and/or sufficient to meet the user's projected financial obligations, then the amount diverted can be higher than when the predicted income is low. Additionally or alternatively, when the tax payment account is created for a merchant, the funds diverted to the tax payment account can include a portion of funds associated with transactions processed by the PSS for the merchant. Information relating to a transaction made by the user is received (step 510) by the PSS. In certain examples, the transaction is processed by the PSS and/or performed using an application executing on a client device of the user (e.g., a mobile device, a tablet computer, or a desktop computer).

The PSS can then determine (step 512) if the transaction has any possible tax consequences for the user. Transactions with possible tax consequences can include, for example, payroll deposits, securities transactions, cryptocurrency transactions, charitable donations, childcare transactions, healthcare transactions, mortgage payments, and/or property tax expenses. If the transaction does not have any tax consequences, the method 500 can return to step 510 where an additional transaction can be received. Alternatively, if the transaction does have tax consequences, the PSS can determine (step 514), based on the transaction information and/or the tax liability information, a modified amount of the payroll funds (and/or other income funds, such as proceeds from a sale of securities) to divert to the tax payment account. This can be done in an effort to adjust a balance of the tax payment account to be closer to a target balance for the account, which may have changed as a result of the transaction. For example, the user may have sold securities for a gain, which can increase the target account balance and require more payroll funds to be diverted to the tax payment account. Alternatively, the user may have sold securities for a loss, made a charitable donation, or obtained a tax credit, which can decrease the target account balance and require less payroll funds to be diverted to the tax payment account. The PSS can then automatically divert (step 516) the modified amount of the payroll funds to the tax payment account.

In some implementations, the tax consequences of a transaction can be displayed on the user's client device before and/or after the transaction has been completed. For example, when the tax service 150 determines that a proposed, pending, or completed transaction will have tax consequences, the tax service 150 can calculate a tax liability associated with the transaction and display the tax liability for the user. The tax liability can be or include, for example, an estimated dollar amount, that the transaction will increase or decrease a total tax liability for the user. Presenting the tax liability information before the user completes the transaction can allow the user to consider the tax consequences of the transaction before deciding whether or not to proceed with the transaction. For example, if the tax consequences of a proposed or pending transaction are higher than what the user would prefer, the user may choose to cancel a proposed transaction.

Additionally or alternatively, in some examples, the tax service 150 can adjust the user's tax withholdings in an effort to achieve a tax goal for the user, such as a desired tax refund or a desired amount owed in taxes at the end of the year. The tax service 150 can recommended certain changes to a W-4 form (or other tax withholdings document) for the user, for example, and the user can then implement those changes with the user's employer. Alternatively, the tax service 150 can generate a modified W-4 form for the user. In some instances, the tax service 150 can assist the user with communicating W-4 form changes to the user's employer. For example, the tax service 150 can generate the W-4 form, prepare an email to send the W-4 form to the employer, and/or send the W-4 form or W-4 form information to the user's employer. The PSS can communicate instructions to a payroll processor server in some instances, to adjust the income tax withheld for the user.

Advantageously, in various examples, the tax service 150 can enable proactive withholding adjustments that allow users to enter their tax withholdings throughout the year and also note their preferred refund amount (e.g., a prefer bigger refund at year end or little or no refund so the users have access to more money during the year). The tax service 150 can generate a W-4 form for a user based on the user's preference, and if the user wants to modify the preference throughout the year (e.g., to get more money now), the tax service can proactively adjust withholdings and/or extract amounts to the tax payment account. Further, a user who is projected to receive a tax refund (e.g., a refund of $10 k on April 15th) can be provided with a loan against the projected refund. The predicted refund amount can be advanced per payroll deposit and, in some instances, can be coupled with a savings account that allows the user to earn interest on the loaned funds.

Further, in some examples, once the year is over, the tax service 150 can generate tax return documentation for the user. For example, the tax service 150 can compile tax information for the user based on the user's payroll funds, direct deposit information, tax deductions, tax credits (e.g., due to child care or education expenses), tax withholdings, and various transactions (e.g., processed using the payment service system 108). The tax service 150 can use the tax information to generate the tax return documentation and can send the documentation to the user. In certain instances, the tax return documentation can serve as a provisional tax return for the user. The tax service 150 can request (e.g., by email or via an application running on the client device) any missing information from the user who can then provide the information to the tax service 150. Once the tax service 150 has received the missing tax information from the user, the tax service 150 can finalize the tax return documentation. The tax service 150 can then send the finalized tax return documentation to the user and/or can assist the user with getting the tax return documentation on file with the appropriate governmental agency.

Advantageously, the generation of tax return documentation by the tax service 150 can eliminate the need for the user to enter information for any tax documents (e.g., as required with existing approaches). The one-click tax filing approach described can allow the tax service 150 to obtain and/or populate all necessary information for the tax return documentation (e.g., for submission to a government tax agency), including payroll data, taxes paid to date, and/or capital gains from securities, upon request or authorization from the user (e.g., the user's click of a button).

As described herein, based on data analytics, and preferably before the user completes a transaction (e.g., during preview of a stock or cryptocurrency), the tax service 150 can proactively display for the user (e.g., on the user's client device) the impact the transaction will have on the user's tax filing. If the user proceeds with the transaction (e.g., sale of stock) and there is an associated increase in tax liability (e.g., due to a capital gain), the tax service 150 can siphon an amount of the transaction to the user's tax payment account, which can be an interest-bearing account. If the transaction involves a decrease in tax liability (e.g., selling stock for a loss), the tax service 150 can pull money out of the tax payment account and transfer funds to a different account managed for the user by the PSS.

Figure 5B:
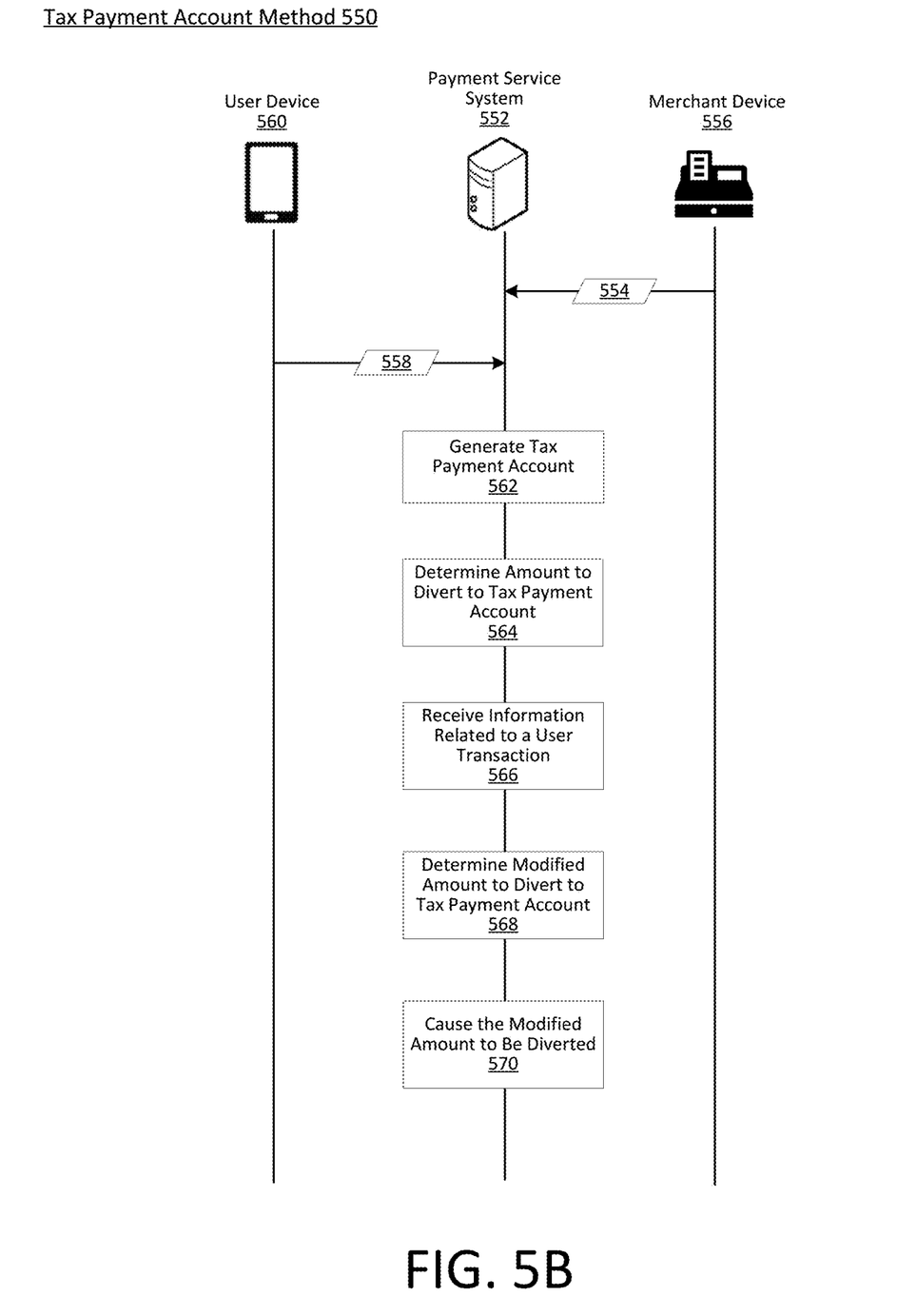
FIG. 5B is a sequence diagram of a method of diverting income funds to a tax payment account, in accordance with certain examples.

FIG. 5B is a sequence diagram of a method 550 of generating and using a tax payment account, in accordance with certain examples. A payment service system (PSS) 552 receives (step 554) payroll funds for a user having a primary account with the PSS 552. The payroll funds can be received from a device 556 of a merchant or other entity that employs the user or provides the payroll funds. The primary account includes a stored balance, and the PSS 552 maintains tax liability information for the user, as described herein. The PSS 552 receives (step 558) from a client device 560 of the user a request to create a tax payment account within or associated with the primary account. In response, the PSS 552 generates (step 562) the tax payment account with the PSS 552. The PSS 552 can then determine (step 564) (e.g., based on the tax liability information) an amount of income funds to divert from the primary account to the tax payment account. The income funds can be or include funds that are received or intended to be received by the primary account. The income funds can include, for example, the payroll funds and/or proceeds from a sale of securities or other transactions. The determined amount of income funds to divert can be based on the stored balance and/or a projected or predicted value for the income funds for a period of time. Next, the PSS 552 can receive (step 566) information relating to a transaction processed for the user by the PSS 552. The transaction can be or include, for example, a payroll deposit, a securities transaction, a cryptocurrency transaction, a charitable donation, a childcare transaction, a healthcare transaction, a mortgage payment, and/or a property tax expense. The PSS 552 can determine (step 568), based on the transaction information, a modified amount of the income funds to divert to the tax payment account. The PSS 552 can then cause (step 570) the modified amount of the income funds to be diverted from the primary account to the tax payment account.

Tax Refund Loan Management

Referring again to FIG. 1, in certain examples, the payment service 108 provides a loan service 160 that can be used to implement loans for users. For example, the loan service 160 can access financial information associated with a user, generate a set of terms for a proposed loan, and send a loan offer to the user containing the terms. When the user accepts the offer, the loan service 160 can initiate and manage the loan for the user. This can involve adding funds corresponding to the loan amount to an account for the user, such as a loan account 162 or loan account 164.

Figure 6:
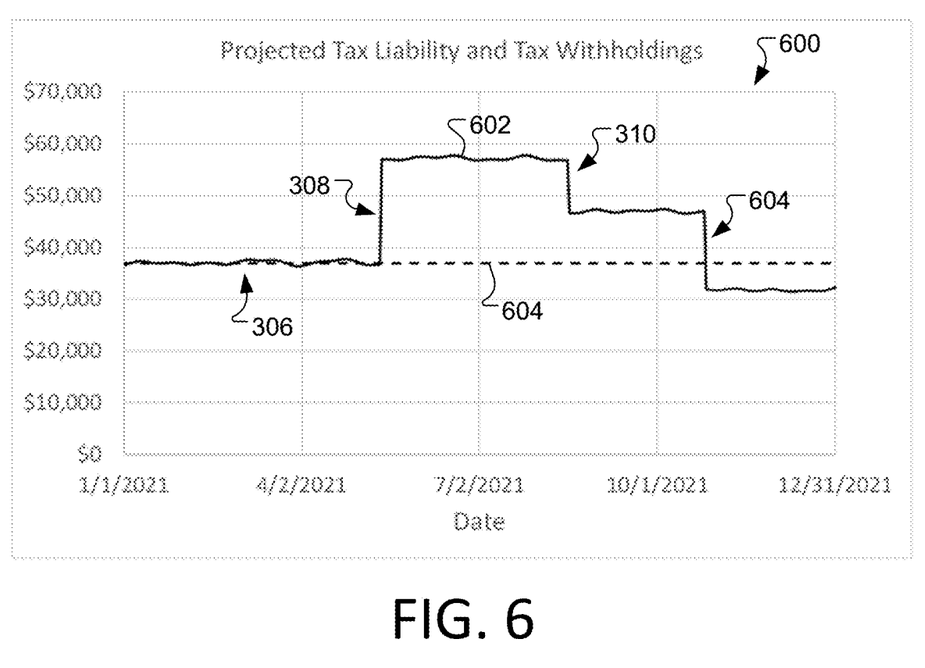
FIG. 6 is a plot of a projected tax liability and projected tax withholdings for a user, in accordance with certain examples.

FIG. 6 is a plot 600 of a projected tax liability 602 and projected tax withholdings 604 for a user during the year 2021, as determined by the tax service 150, in accordance with certain examples. The projected tax withholdings 604 is identical to the projected tax withholdings 302 and is constant at $37,000. The projected tax liability 602 is similar to the projected tax liability 302 except that the projected tax liability 602 is changed by an event 604, in addition to transaction events 308 and 310. The additional event 604 causes the projected tax liability 602 to decrease by an additional $15,000. The additional event 604 can be or include a transaction event in which the user lost money (e.g., due to a sale of securities) or reduced a tax liability (e.g., due to a charitable donation or a tax credit). At the end of the year in this example, the user's projected tax liability 302 is at about $32,000, which is lower than the projected tax withholdings 604 of $37,000. The user can expect to receive a refund of about $5,000 in taxes in this case.

In various examples, based on these projections, the loan service 160 can determine that the user should be offered a loan for the amount of the refund. The loan service 160 can loan the projected refund amount or a similar amount (e.g., $5,000) to the user from a financial account of the payment service 108, and the user can pay back the loan once the refund is received, or alternatively, the refund amount can be automatically sent and paid to an account of the payment service 108. In some implementations, the loan service 160 includes, utilizes, or manages financial accounts for providing loans to users. The financial accounts can include or access a variety of assets, including cash, money markets, cryptocurrency, and/or securities.

Figure 7:
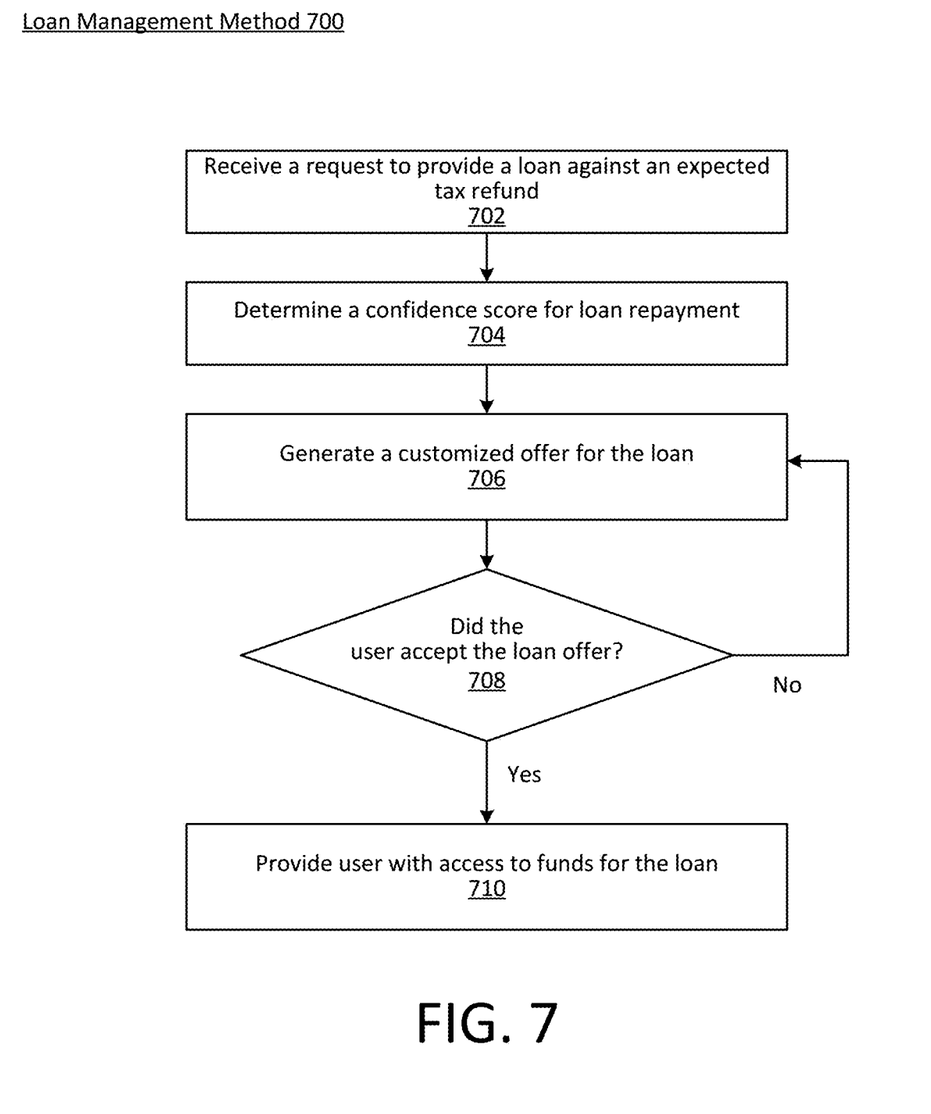
FIG. 7 is a flowchart of a method of managing a loan, in accordance with certain examples.

FIG. 7 is a flowchart of a method 700 of managing a loan, in accordance with certain examples. A payment service system (PSS) (e.g., the payment service system 108) receives (step 702) a request to provide a loan against an expected tax refund for a user having an account with the PSS. The request can be received from the user via an application executing on a client device of the user and/or can be received before preparation of a tax return for the user. For example, the request can be received after the user and/or the PSS determine that the user is projected to receive a tax refund. Additionally or alternatively, the PSS can prepare tax return documentation for the user, and the request can be received before or after the tax return documentation has been prepared.

Next, the PSS can determine (step 704) a confidence score for loan repayment. The confidence score can indicate a likelihood that the user will repay the requested loan and/or can provide an indication of a risk of default for the loan. The PSS can determine confidence score based on a transaction history of the user on the PSS (e.g., a record of the user's transactions in the PSS). For example, if the transaction history for the user is associated with a good credit rating or indicates that the user pays debts or meets financial obligations in a timely manner, the PSS can determine that the confidence score for loan repayment is high. Alternatively, if the user's transaction history indicates the user has a poor credit rating or fails to meet financial obligations in a timely manner, the PSS can determine that the confidence score for loan repayment is low.

In some examples, the confidence score can be based on a timing of the request. For example, the confidence score can be based on an expected amount of time between initiation of the loan and receipt of the tax refund (e.g., from the Internal Revenue Service). When the amount of time is short (e.g., less than 10 days), the confidence score can be higher than when the amount of time is long (e.g., greater than 60 days). Alternatively or additionally, the confidence score can be based on one or more of the following: a regularity or amount of direct deposit paychecks for the user to the PSS, a history of loan repayment by the user on the PSS, a tax return filing history on the PSS for the user, or a securities transaction processed by the PSS (e.g., via the application) for the user.

In some implementations, the confidence score can be determined using one or more machine learning models. The models can be trained using data gathered across multiple users of the PSS. Such training data can include, for example, information related to previous loans generated for users, such as, for example, loan amount, loan duration (e.g., time between loan initiation and repayment), user income, user debts, user transactions with the PSS, and/or whether or not default occurred. When determining the confidence score for a proposed loan, the machine learning model can receive such information for the user as input and provide the confidence score as output. In certain examples, the confidence score can include an indication of a risk of fraud associated with the user. For example, a higher likelihood of fraud can reduce the confidence score.

Based on the confidence score (e.g., including the timing of the request), the PSS can generate (step 706) a customized offer for the loan against the expected tax refund. When the confidence score is high, for example, the offer can include higher loan amounts and/or longer loan durations. The offer can be presented to the user (e.g., via the application executing on the user client device), and the PSS can determine (step 708) whether or not the user has accepted the offer. For example, the PSS can receive an indication that the user has declined the offer. In this case, the method 700 can return to step 706 where a new offer can be generated for the user (e.g., with loan terms that are more favorable for the user). Alternatively, if the PSS receives an indication that the user has accepted the offer, the PSS can process the loan and provide (step 710) the user with access to funds for the loan. This can include adding the funds to an account the user has with the PSS and deducting funds of a loan servicing account of the PSS (e.g., included in or managed by the loan service 160).

For repayment of the loan, the user can agree to allow the PSS to withdraw funds from the user's account in a manner consistent with the accepted offer. Alternatively or additionally, the PSS can withhold or retrieve proceeds received by the user in one or more transactions, such as a securities transaction. For example, the user can agree to repay the loan by allowing the PSS to acquire a portion of proceeds received by the user for a securities transaction or similar transaction. In some instances, the user and/or the PSS can make arrangements for the tax refund to be received in the user's account with the PSS. Repayment can occur automatically once the refund is received.

Advantageously, the loan can enable the user to receive, in effect, an instant refund that is provided immediately to the user's account upon completion of the user's tax filing. In some examples, the loan amount can be scaled based on a confidence score the PSS has in the user's tax status (e.g., an accuracy of the projected tax refund or projected tax liability). Based on securities transactions, detected transactions, and/or projected upcoming transactions (e.g., upcoming rent payment), the PSS can incrementally release loan funds to the user or hold more funds related to the tax refund.

Computer Implementation

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

What is claimed is:

1. A computer-implemented method, comprising:
monitoring, by a payment service system (PSS) and in real-time, transactions of one or more users of the PSS via one or more instances of a payment application, provided by the PSS, executing on one or more client devices of the one or more users, wherein the transactions are associated with transaction data;

receiving, by the PSS and from a client device of a user of the one or more users, a request by the user to complete a transaction for a transaction amount via the PSS;

dynamically determining, by the PSS, a predicted tax liability amount associated with the transaction, wherein the predicted tax liability amount is determined using one or more machine learning models and a portion of the transaction data associated with the user, and wherein the predicted tax liability amount associated with the transaction increases or decreases a total tax liability of the user;

while the transaction is pending completion, causing presentation, via the PSS and on a display of the client device of the user, of the predicted tax liability amount and a request for confirmation to proceed with the transaction; and modifying, by the PSS and based at least in part on receiving the confirmation to proceed with the transaction, tax liability information for the user, wherein modified tax liability information for the user reflects the completed transaction, and wherein the modifying is performed without further input from the user.

2. The computer-implemented method as claim 1 recites, wherein the predicted tax liability amount increases a total tax liability for the user, the computer-implemented method further comprising:

based on receiving the confirmation to proceed with the transaction, transferring a portion of the transaction amount to a tax payment account of the user, wherein the portion of the transaction amount is based at least in part on the predicted tax liability amount.

3. The computer-implemented method as claim 2 recites, wherein the tax payment account comprises an interest-bearing account configured to hold funds of the user for a period of time preceding tax return preparation, and wherein the funds held in the tax payment account are separate from funds held in an account associated with initiation of the transaction.

4. The computer-implemented method as claim 2 recites, further comprising:

creating the tax payment account.

5. The computer-implemented method as claim 2 recites, wherein the one or more machine learning models comprise one or more first machine learning models, and the computer-implemented method further comprising:

determining, based at least in part on application of a second machine learning model, an optimum time to transfer the portion of the transaction amount to the tax payment account of the user, wherein the portion of the transaction amount is transferred at the optimum time.

6. The computer-implemented method as claim 1 recites, wherein the predicted tax liability amount decreases a total tax liability for the user, the computer-implemented method further comprising:

based on receiving the confirmation to proceed with the transaction, transferring a portion of the transaction amount from a tax payment account of the user to a different account managed for the user by the PSS, wherein the portion of the transaction amount is based at least in part on the predicted tax liability amount.

7. The computer-implemented method as claim 1 recites, wherein the tax liability information and the modified tax liability information comprise at least one of income information, tax deduction information, or tax credit information.

8. The computer-implemented method as claim 1 recites, further comprising:

preparing, by the PSS, tax return documentation for the user based on the modified tax liability information.

9. The computer-implemented method as claim 1 recites, wherein the transaction comprises at least one of a securities transaction, a cryptocurrency transaction, a charitable donation transaction, a healthcare expense transaction, a property tax transaction, or a childcare expense transaction.

10. A system comprising:

one or more processors; and one or more non-transitory computer-readable media storing computer-executable instructions that, that, when executed by the one or more processors, cause the one or more processors to perform acts comprising:

monitoring, by a payment service system (PSS) and in real-time, transactions of one or more users of the PSS via one or more instances of a payment application, provided by the PSS, executing on one or more client devices of the one or more users, wherein the transactions are associated with transaction data;

receiving, by the PSS and from a client device of a user of the one or more users, a request by the user to complete a transaction for a transaction amount via the PSS;

dynamically determining, by the PSS, a predicted tax liability amount associated with the transaction, wherein the predicted tax liability amount is determined using one or more machine learning models and a portion of the transaction data associated with the user, and wherein the predicted tax liability amount associated with the transaction increases or decreases a total tax liability of the user;

while the transaction is pending completion, causing presentation, via the PSS and on a display of the client device of the user, of the predicted tax liability amount and a request for confirmation to proceed with the transaction; and at least partly responsive to causing presentation of the predicted tax liability amount and the request for confirmation, receiving a request by the user to cancel the transaction.

11. The system as claim 10 recites, wherein the transaction comprises at least one of a securities transaction, a cryptocurrency transaction, a charitable donation transaction, a healthcare expense transaction, a property tax transaction, or a childcare expense transaction.

12. The system as claim 10 recites, wherein the predicted tax liability amount increases a total tax liability for the user, the acts further comprising:

based on receiving the confirmation to proceed with the transaction, transferring a portion of the transaction amount to a tax payment account of the user, wherein the portion of the transaction amount is based at least in part on the predicted tax liability amount.

13. The system as claim 12 recites, wherein the one or more machine learning models comprise one or more first machine learning models, and the acts further comprising:

determining, based at least in part on application of a second machine learning model, an optimum time to transfer the portion of the transaction amount to the tax payment account of the user, wherein the portion of the transaction amount is transferred at the optimum time.

14. The system as claim 10 recites, wherein the predicted tax liability amount decreases a total tax liability for the user, the acts further comprising:
- based on receiving the confirmation to proceed with the transaction, transferring a portion of the transaction amount from a tax payment account of the user to a different account managed for the user by the PSS, wherein the portion of the transaction amount is based at least in part on the predicted tax liability amount.

15. One or more non-transitory computer-readable media storing computer-executable instructions that, when executed by one or more processors, cause the one or more processors to perform acts comprising:
- monitoring, by a payment service system (PSS) and in real-time, transactions of one or more users of the PSS via one or more instances of a payment application, provided by the PSS, executing on one or more client devices of the one or more users, wherein the transactions are associated with transaction data;
- receiving, by the PSS and from a client device of a user of the one or more users, a request by the user to complete a transaction for a transaction amount via the PSS;
- dynamically determining, by the PSS, a predicted tax liability amount associated with the transaction, wherein the predicted tax liability amount is determined using one or more machine learning models and a portion of the transaction data associated with the user, and wherein the predicted tax liability amount associated with the transaction increases or decreases a total tax liability of the user;
- while the transaction is pending completion, causing presentation, via the PSS and on a display of the client device of the user, of the predicted tax liability amount and a request for confirmation to proceed with the transaction; and
- modifying, by the PSS and based at least in part on receiving the confirmation to proceed with the transaction, tax liability information for the user, wherein modified tax liability information for the user reflects the completed transaction, and wherein the modifying is performed without further input from the user.

16. The one or more non-transitory computer-readable media as claim 15 recites, wherein the tax liability information and the modified tax liability information comprise at least one of income information, tax deduction information, or tax credit information.

17. The one or more non-transitory computer-readable media as claim 15 recites, wherein the transaction comprises at least one of a securities transaction, a cryptocurrency transaction, a charitable donation transaction, a healthcare expense transaction, a property tax transaction, or a childcare expense transaction.

18. The one or more non-transitory computer-readable media as claim 15 recites, wherein the predicted tax liability amount increases a total tax liability for the user, the acts further comprising:
- based on receiving the confirmation to proceed with the transaction, transferring a portion of the transaction amount to a tax payment account of the user, wherein the portion of the transaction amount is based at least in part on the predicted tax liability amount.

19. The one or more non-transitory computer-readable media as claim 18 recites, wherein the one or more machine learning models comprise one or more first machine learning models, and the acts further comprising:
- determining, based at least in part on application of a second machine learning model, an optimum time to transfer the portion of the transaction amount to the tax payment account of the user,
- wherein the portion of the transaction amount is transferred at the optimum time.

20. The one or more non-transitory computer-readable media as claim 15 recites, wherein the predicted tax liability amount decreases a total tax liability for the user, the acts further comprising:
- based on receiving the confirmation to proceed with the transaction, transferring a portion of the transaction amount from a tax payment account of the user to a different account managed for the user by the PSS, wherein the portion of the transaction amount is based at least in part on the predicted tax liability amount.

* * * * *